(No Model.)
C. ALBERSEN.
CULTIVATOR.
No. 427,142. Patented May 6, 1890.
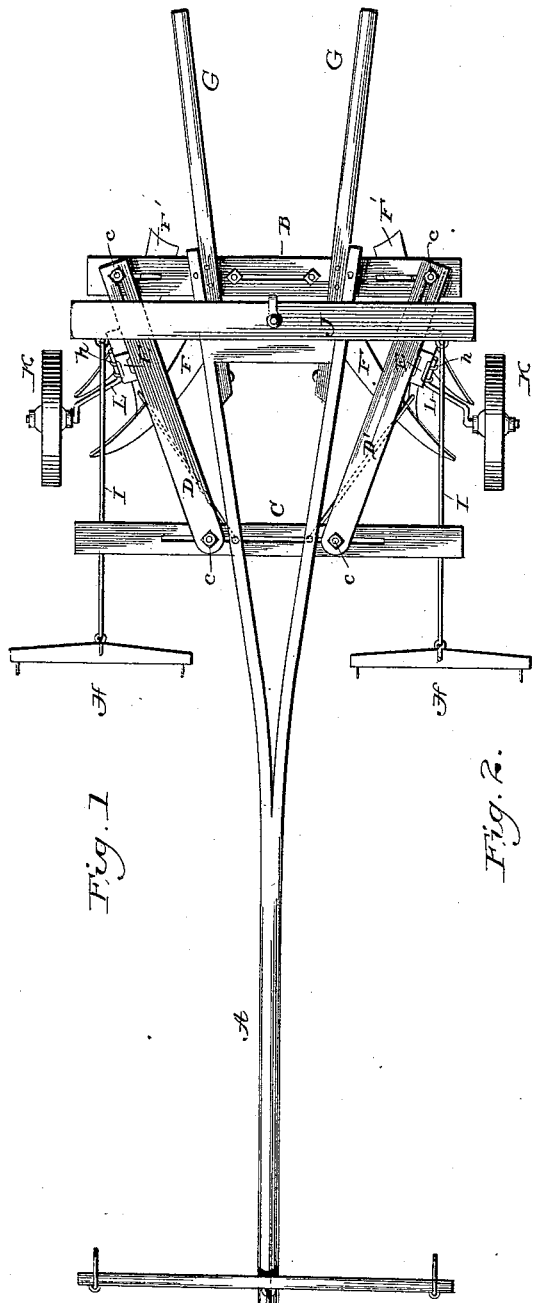
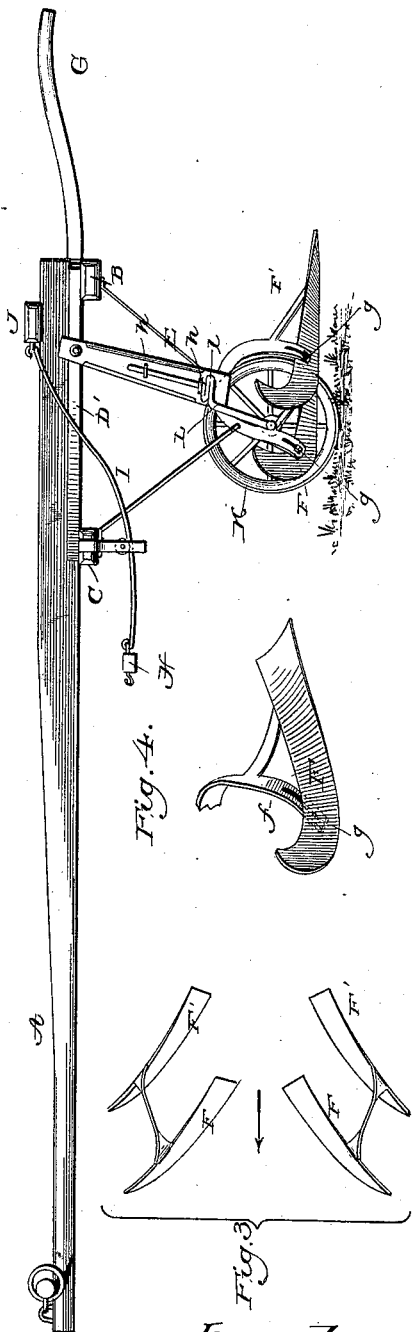
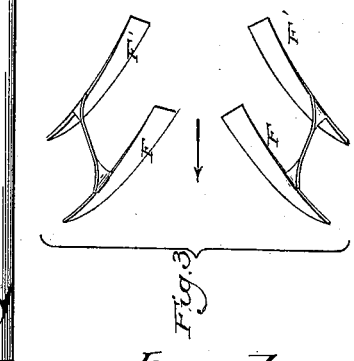
Witnesses
Inventor:
Charles Albersen
By Phil T. Dodge Atty

UNITED STATES PATENT OFFICE.

CHARLES ALBERSEN, OF ASHKUM, ILLINOIS.

CULTIVATOR.

SPECIFICATION forming part of Letters Patent No. 427,142, dated May 6, 1890.

Application filed March 11, 1889. Serial No. 302,791. (No model.)

*To all whom it may concern:*

Be it known that I, CHARLES ALBERSEN, of Ashkum, in the county of Iroquois and State of Illinois, have invented certain Improvements in Cultivators, of which the following is a specification.

My invention has reference to a machine for the cultivation of corn, and is intended more particularly to destroy the weeds, loosen the soil, and throw the latter inward on both sides of the corn-row without danger of destroying the young corn.

My invention embraces as its essential features a draft-frame provided on each side with two long blades lying one behind the other in paths oblique to the line of travel, each blade presenting a substantially upright face at the forward end, and being gradually curved or twisted thence rearward, so that its rear end is presented in a substantially horizontal position adapted to undercut the weeds.

In the accompanying drawings, Figure 1 is a top plan view of my machine with the wheels in place thereon. Fig. 2 is a side elevation of the same, one of the wheels and its supporting-arm being removed. Fig. 3 is a plan view of the two pairs of shovels or blades. Fig. 4 is a perspective view of one of the blades.

Referring to the drawings, A represents a tongue or draft-pole, having its rear end divided, spread laterally, and secured firmly to an underlying cross-bar B.

C is a second cross-bar secured to the under side of the tongue at a considerable distance from its rear end.

D D' are two longitudinal bars secured at their rear ends by vertical bolts c to the cross-bars B and C, respectively, the cross-bars being slotted to permit the position of the longitudinal bars to be changed, in order to vary the angle at which the shares or blades stand in relation to the line of travel.

E E are two standards fixed at their upper ends rigidly to the bars D and D', respectively, and each carrying at the lower ends two blades or shares F and F'. The two blades in each pair are secured to the lower ends of ∩-shaped arms *f*, which are in turn bolted to the standard E. Each of the blades is elongated horizontally, turned upward at the forward end, after the manner of a runner, and curved or twisted longitudinally in such manner that while its forward end presents a vertical or practically vertical face the position of the face gradually changes until at the rear end of the blade it is approximately horizontal in cross-section. The lower inner edge is suitably sharpened to admit of its entering the soil and destroying the weeds and grass. The blades at opposite sides of the machine converge toward the rear, as shown in Fig. 3, and, as shown in the same figure, the blades on each side of the machine are arranged one behind the other. The forward blades F and F have their rear ends arranged nearer together than the rear ends of the blades F' F'.

I am aware that elongated blades or shares have been constructed and arranged in various ways.

The distinguishing features of my machine, as regards the shares, are their arrangement in converging pairs, the forward pair closer together than the others, when the blades thus arranged have their faces curved from a substantially vertical position at the front to a substantially horizontal position at the rear. When thus arranged, the forward and widely-separated ends of the blades loosen the earth and turn the same inward toward the growing plants from the opposite sides. Owing, however, to the fact that the blades turn downward toward the rear, the earth is permitted to escape outward or flow over them as it approaches the plants, so that the covering or breaking down of the plants by the application of an excessive amount of earth is prevented. The rear ends of the blades cut beneath the surface of the soil and destroy the weeds close to the plants without, however, throwing the earth upon the plants in an objectionable manner.

It will be observed that the gathering or hilling effect is secured almost entirely by the forward ends of the blades, while the rear ends are relied upon to spread or distribute the loosened earth and to undercut the weeds.

In order to permit the application of the draft-animals, I provide the rear end of the frame with a centrally-pivoted evener J, from which rods I are extended forward to suitable guides to carry the singletrees H on their forward ends.

The machine is ordinarily operated without wheels; but to permit its convenient transportation or its more convenient operation in soft ground I provide two carrying-wheels K, each mounted in an axle L, one end of which is turned upward and adapted for insertion at will through staples or ears $h$ on the standards E. Projections $l$ on the axle bear against the side faces of the standards E to hold the wheels from swinging out of position.

Having thus described my invention, what I claim is—

1. In a cultivator, the draft-frame provided with standards E, in combination with the four blades or shares F F′, arranged in pairs one behind another in lines oblique to the line of travel, one pair on each side of the machine, each blade presenting an upright surface at the front end, but a curved or twisted face rearward, until it finally presents an approximately horizontal surface at the rear end.

2. In a cultivator, the combination of the two pairs of blades F and F′, located on opposite sides of the central line in positions oblique to the line of travel, the forward blades having their rear ends nearer together than the ends of the rear blades, and each blade curved longitudinally, so that its forward end presents an upright and its rear end an approximately horizontal surface.

In testimony whereof I hereunto set my hand in the presence of two attesting witnesses.

CHARLES ALBERSEN.

Witnesses:
S. JOHNSON,
CASSEN KLEEMANN.